United States Patent
Mitsutomi et al.

(10) Patent No.: US 9,273,756 B2
(45) Date of Patent: Mar. 1, 2016

(54) POWER TRANSMISSION BELT

(75) Inventors: Manabu Mitsutomi, Hyogo (JP); Yorifumi Hineno, Hyogo (JP); Satoshi Shimoo, Itami (JP)

(73) Assignee: Mitsuboshi Belting Ltd. (JP)

( * ) Notice: Subject to any disclaimer, the term of this patent is extended or adjusted under 35 U.S.C. 154(b) by 525 days.

(21) Appl. No.: 12/454,902

(22) Filed: May 26, 2009

(65) Prior Publication Data
US 2009/0291796 A1 Nov. 26, 2009

(30) Foreign Application Priority Data
May 26, 2008 (JP) ................................. 2008-137148

(51) Int. Cl.
F16G 1/00 (2006.01)
F16G 5/00 (2006.01)
F16G 9/00 (2006.01)
F16G 1/21 (2006.01)
F16G 1/22 (2006.01)
F16G 5/16 (2006.01)
F16G 5/20 (2006.01)
B29D 29/10 (2006.01)

(52) U.S. Cl.
CPC ................ *F16G 5/20* (2013.01); *B29D 29/103* (2013.01); *F16G 5/166* (2013.01)

(58) Field of Classification Search
CPC .............. F16G 5/20; F16G 5/06; F16G 1/28; F16G 5/166; B29D 29/08
USPC .................. 474/238, 242, 246, 264, 263, 237
See application file for complete search history.

(56) References Cited

U.S. PATENT DOCUMENTS

| | | | | |
|---|---|---|---|---|
| 2,062,568 A * | 12/1936 | Freedlander | ............... | F16G 5/20 474/252 |
| 2,086,804 A * | 7/1937 | Hjartsater | ................. | F16G 5/04 428/156 |
| 3,090,716 A * | 5/1963 | Stevens | ................... | B29D 29/10 156/139 |
| 3,164,026 A * | 1/1965 | Terhune | ................. | B65G 15/32 156/141 |
| 3,246,735 A * | 4/1966 | Davis | ..................... | B65G 15/34 198/847 |
| 3,343,425 A * | 9/1967 | Terhune | .................... | F16G 9/00 474/264 |
| 3,404,577 A * | 10/1968 | Zahn | ......................... | F16G 5/00 474/148 |
| 3,416,383 A * | 12/1968 | Brooks | .................. | B29D 29/10 474/261 |
| 3,473,989 A * | 10/1969 | Richmond | ........... | B29D 29/106 156/138 |
| 3,479,892 A * | 11/1969 | Cicognani | .............. | B29D 29/10 474/264 |
| 3,566,706 A * | 3/1971 | Fix | .......................... | F16G 5/166 474/237 |
| 3,800,611 A * | 4/1974 | Rogers | ...................... | F16G 5/06 474/261 |
| 3,818,741 A * | 6/1974 | Terhune | ............... | B29D 29/103 428/131 |
| 3,964,329 A * | 6/1976 | Wolfe | ..................... | F16G 5/166 474/263 |
| 3,981,206 A * | 9/1976 | Miranti, Jr. | .......... | B29D 29/103 474/238 |
| 3,987,684 A * | 10/1976 | Fisher | .................... | F16G 5/166 156/142 |

(Continued)

FOREIGN PATENT DOCUMENTS

JP A-2003-202055 7/2003

*Primary Examiner* — Henry Liu
(74) *Attorney, Agent, or Firm* — Wood, Phillips, Katz, Clark & Mortimer

(57) ABSTRACT

A power transmission belt with a body made from a first rubber composition in which at least one load carrying member is embedded. The body has a plurality of laterally spaced ribs with exposed surfaces on the inside of the body. The ribs are made from a second rubber composition in which: a) a plasticizer of 8.3 to 10.7 $(cal/cm^3)^{1/2}$ in solubility parameter; and b) solid lubricant are respectively blended in an amount: i) 5 to 25 pts.wt.; and ii) 5 to 50 pts.wt. per 100 pts.wt. ethylene-α-olefin elastomer. The body further has short fibers fixed at the exposed, pulley engaging rib surfaces.

25 Claims, 8 Drawing Sheets

(56) References Cited

U.S. PATENT DOCUMENTS

| | | | | |
|---|---|---|---|---|
| 4,244,234 A * | 1/1981 | Standley | F16G 5/166 | 156/139 |
| 4,457,743 A * | 7/1984 | Robecchi | F16G 5/14 | 474/260 |
| 4,504,256 A * | 3/1985 | Matsumura | F16G 5/06 | 474/153 |
| 4,504,258 A * | 3/1985 | Tanaka | F16G 5/06 | 198/847 |
| 4,509,938 A * | 4/1985 | Woodland | F16G 5/20 | 474/263 |
| 4,530,684 A * | 7/1985 | Miranti, Jr. | B29D 29/106 | 474/264 |
| 4,571,230 A * | 2/1986 | Woodland | F16G 5/20 | 474/263 |
| 4,682,973 A * | 7/1987 | Fujita | F16G 5/06 | 198/847 |
| 4,798,566 A * | 1/1989 | Sedlacek | F16G 5/20 | 474/238 |
| 4,892,510 A * | 1/1990 | Matsuoka | F16G 5/20 | 156/138 |
| 4,931,118 A * | 6/1990 | Kitahama | B29C 43/021 | 156/138 |
| 5,116,286 A * | 5/1992 | Kinoshita | F16G 5/06 | 474/237 |
| 5,173,361 A * | 12/1992 | Yamashita | F16G 1/12 | 152/526 |
| 5,197,928 A * | 3/1993 | Mishima | B29C 70/545 | 156/137 |
| 5,250,010 A * | 10/1993 | Mishima | F16G 1/28 | 474/263 |
| 5,306,213 A * | 4/1994 | Nakajima | B29D 29/08 | 474/205 |
| 5,415,594 A * | 5/1995 | Kitahama | F16G 5/20 | 474/263 |
| 5,904,630 A * | 5/1999 | Berthelier | F16G 5/20 | 474/263 |
| 6,176,799 B1 * | 1/2001 | Kinoshita | F16G 1/28 | 428/337 |
| 6,361,462 B1 * | 3/2002 | Takada | F16G 5/20 | 474/237 |
| 6,482,118 B1 * | 11/2002 | Watanabe | F16G 5/20 | 474/263 |
| 6,491,598 B1 * | 12/2002 | Rosenboom | B32B 25/14 | 428/515 |
| 6,561,937 B1 * | 5/2003 | Wegele | F16G 1/08 | 474/263 |
| 6,793,599 B2 * | 9/2004 | Patterson | B29D 29/08 | 474/260 |
| 6,918,849 B2 * | 7/2005 | Gregg | F16G 1/08 | 156/137 |
| 6,945,892 B2 * | 9/2005 | Knutson | B29D 29/08 | 156/137 |
| 6,991,692 B2 * | 1/2006 | Patterson | B29D 29/08 | 156/137 |
| 7,128,674 B2 * | 10/2006 | Teves | F16G 1/06 | 474/238 |
| 7,135,082 B2 * | 11/2006 | Hara | B29D 29/08 | 156/138 |
| 7,819,767 B2 * | 10/2010 | Nishida | F16G 5/06 | 474/237 |
| 2003/0017900 A1 * | 1/2003 | Kopang | B29D 29/00 | 474/260 |
| 2003/0073533 A1 * | 4/2003 | Knutson | B29D 29/08 | 474/263 |
| 2005/0143209 A1 * | 6/2005 | Shibutani | F16G 5/20 | 474/260 |
| 2007/0060431 A1 * | 3/2007 | Hineno | F16G 5/20 | 474/263 |
| 2007/0082777 A1 * | 4/2007 | Nishida | F16G 5/06 | 474/237 |

* cited by examiner

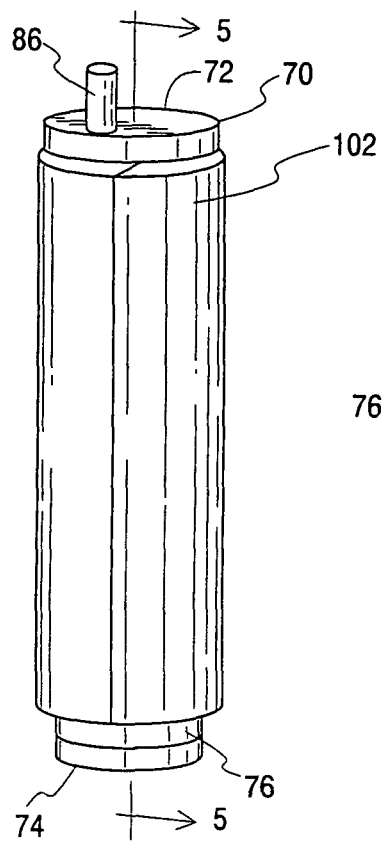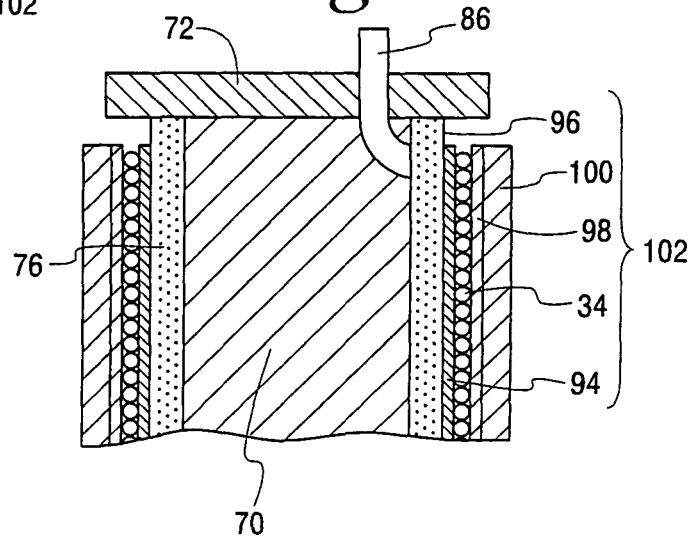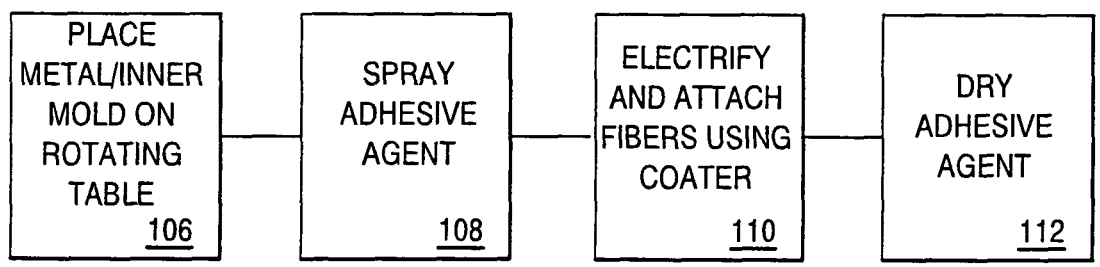

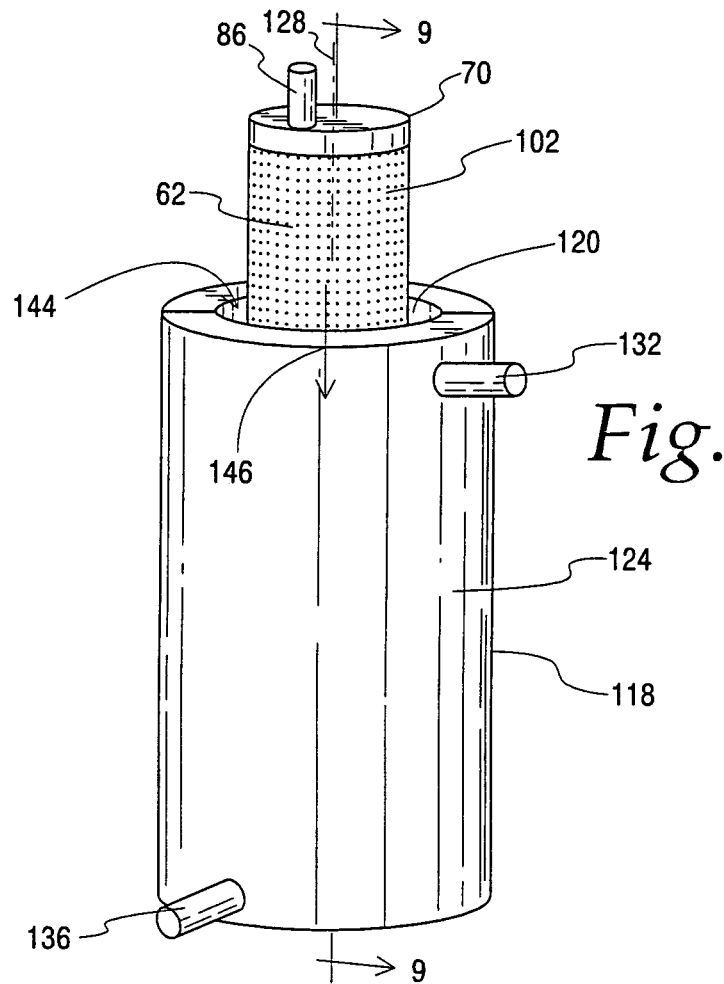
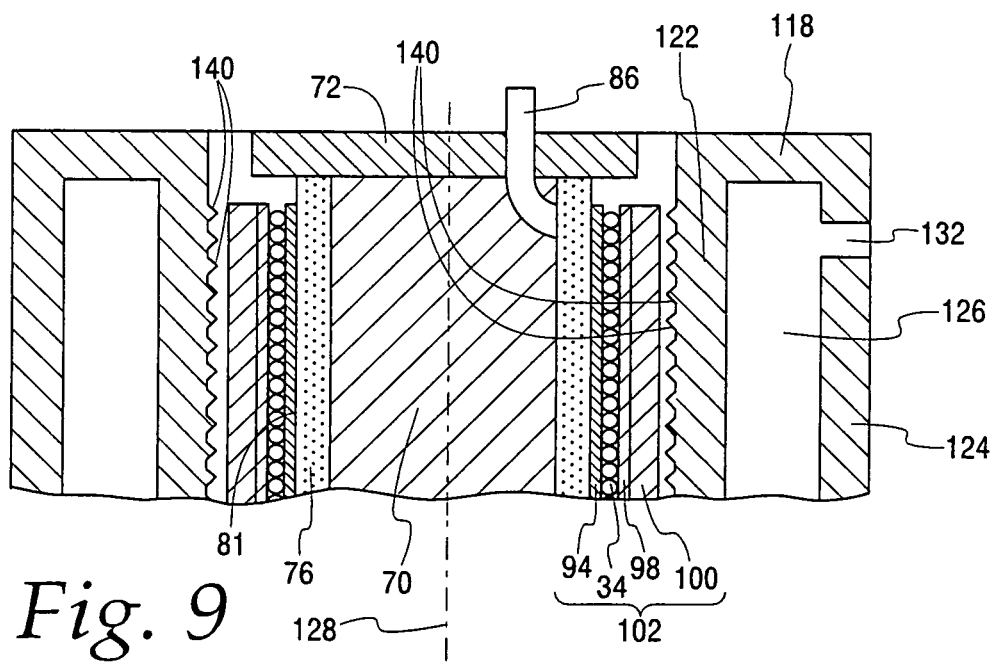
Fig. 8
Fig. 9

POWER TRANSMISSION BELT

BACKGROUND OF THE INVENTION

1. Field of the Invention

This invention relates to power transmission belts and, more particularly, to a power transmission belt with a plurality of ribs extending lengthwise of the belt.

2. Background Art

Power transmission belts are used on a wide range of vehicles in many different environments. As an example, power transmission belts are used to drive auxiliary components such as air compressors, alternators, or the like, on such vehicles. Over the years, the performance expectations for such belts have increased.

There is a growing emphasis on minimizing noise generation during operation of such vehicles. Efforts have been made to eliminate, to the extent possible, all noise other than that generated by the engine of the vehicle itself, during operation. To achieve this end, measures have been taken to minimize sound generation caused by the interaction between power transmission belts and complementary pulleys that drive and/or are driven by such belts.

Sound tends to generate when belts slip relative to cooperating pulleys, as may be caused by variations in the rotational speed of the engine and/or operation under high load conditions. Additionally, noise generates as belt ribs wear during normal operation, as an incident of which the ribs tend to adhere to the bottom of cooperating grooves, particularly with a V-ribbed belt construction.

Noise also tends to generate in systems wherein there is misalignment of system pulleys that causes the belts to twist and/or skew as they move in their respective paths. Sound generates based upon disproportional loading. All of these conditions may generate noise that is audible to occupants of the vehicles.

Rubber belts are generally required to transmit relatively large forces not only under dry conditions, but also in humid conditions and in conditions wherein water, as in the form of rain, is in contact with the belts and pulleys. As one example, with an engine operating, water entering the engine compartment in rainy weather tends to migrate into gaps between the belts and cooperating pulleys. As a result, the slip rate of the belts increases, which compromises their performance by reducing their ability to transmit forces. This condition also is responsible for noise generation.

To address the above problems, it is known in the art to incorporate into the rubber, defining ribs of a V-ribbed belt, cotton short fibers, together with nylon short fibers having an intermediate elasticity modulus between the elasticity modulus of the belt body rubber and that of the cotton short fibers. This construction is disclosed in JP-A-2003-202055.

In this construction, the cotton and nylon short fibers suppress the rapid slip phenomenon that tends to generate unwanted noise during operation.

To effectively control the slip phenomenon and noise generation, the cotton and nylon short fibers must be exposed at the surfaces of the belt, such as those on a V-ribbed belt, that engage cooperating pulley surfaces. To accomplish this, the fibers are fully embedded in the belt rubber during formation. The fibers are oriented laterally in the ribs. To form the ribs, the rubber layer in which the fibers are embedded is cut. This results in potentially relatively high manufacturing costs and also produces rubber waste that must be handled after the belt formation.

With this construction, most of the short fibers in the ribs are fully embedded in the rib rubber. The portion of the fibers exposed at the pulley-engaging surfaces is relatively small compared with the overall blended quantity of the short fibers within the rubber. As a result, the exposed fiber portions may not effectively suppress slippage and avoid unwanted sound emission.

To address this concern, the amount of short fibers within the rubber may be increased. However, by so doing, the flexibility of the belt may be significantly compromised. Alternatively, the degree of exposure of the embedded fibers may be increased by deforming the projecting portions thereof, as through a polishing process. As a practical matter, the deformation of the short fibers caused by the polishing is relatively insignificant. It is practically impossible to significantly increase the amount of exposure of the short fibers by this process, or other processes, without detrimentally increasing the density of fibers within the rubber composition.

By increasing the quantity of fibers, aside from decreasing belt flexibility, the lifetime of the belt may be significantly reduced due to the non-uniform dispersal of the short fibers in the rubber. This condition commonly occurs with a greater density of the fibers. Thus, these prior art attempts to suppress slippage and unwanted noise are lacking in terms of their overall effectiveness.

The industry continues to seek out designs that adequately address the above issues without compromising other performance aspects of the belt.

SUMMARY OF THE INVENTION

In one form, the invention is directed to a power transmission belt having a body with a length, a width between laterally spaced side surfaces, an inside and an outside. The body is made from a first rubber composition in which at least one load carrying member is embedded and extends in a lengthwise direction. The body has a plurality of laterally spaced ribs extending lengthwise of the body with exposed surfaces, on one of the inside and outside of the body, to engage a complementarily-shaped pulley to drive, or be driven by, the pulley. The ribs have a second rubber composition in which: a) a plasticizer of 8.3 to 10.7 $(cal/cm3)^{1/2}$ in solubility parameter; and b) solid lubricant are respectively blended in an amount: i) 5 to 25 pts.wt.; and ii) 5 to 50 pts.wt. per 100 pts.wt. ethylene-α-olefin elastomer. The body further has short fibers fixed at the exposed, pulley-engaging rib surfaces.

In one form, the body has a first layer made from the first rubber composition and a second layer joined to the first layer and made from the second rubber composition. The first rubber composition is an ethylene-α-olefin elastomer without the plasticizer of the second rubber composition.

In one form, the first layer has an inside surface to which the second layer is joined.

In one form, the ribs are defined by applying pressure to the second layer to form grooves between adjacent ribs.

In one form, the short fibers are defined as a flocked layer on the exposed, pulley-engaging rib surfaces.

In one form, the plasticizer is an ether ester type plasticizer.

In one form, the solid lubricant is at least one of: a) graphite; b) molybdenum disulfide; and c) polytetrafluoroethylene.

In one form, the short fibers are not fully embedded in the second layer.

In one form, the ribs are on the inside of the body and the body further is made from a third rubber composition outside of the at least one load carrying member in which short fibers are embedded.

In one form, the short fibers embedded in the third rubber composition are randomly oriented.

In one form, the ribs are formed on the inside of the body without grinding/cutting the second rubber composition.

In one form, the short fibers are made from at least one of: a) rayon; b) cotton; c) polyester; d) polyamide; e) aramid; f) vinylon; g) carbon; and h) polytetrafluoroethylene.

In one form, the short fibers have: a) a length in a range of 0.05 to 2.5 mm; b) a diameter in a range of 3 to 80 µm; and c) an aspect ratio (length/diameter) in a range of 30 to 300.

In one form, the short fibers have an implantation density in a range of 10,000 to 50,000 fibers/cm$^2$.

In one form, the short fibers are implanted using an electrostatic implanting process.

In one form, the ribs are formed from a layer with the second rubber composition without removing the rubber composition from the layer.

BRIEF DESCRIPTION OF THE DRAWINGS

FIG. 4 is a view as in FIG. 2 with a belt sleeve, formed to produce the power transmission belt in FIG. 1, thereon and in an unvulcanized state;

FIG. 5 is an enlarged, partial, cross-sectional view of the metal/inner mold with the belt sleeve thereon and taken along line 5-5 of FIG. 4;

FIG. 7 is a schematic representation of a method for producing the flocked layer on the belt in FIG. 6;

FIG. 8 is a perspective view of a vulcanizing mold with the subassembly in FIG. 6 being directed thereinto;

FIG. 9 is an enlarged, partial, cross-sectional view of the top portion of the vulcanizing mold with the subassembly of FIG. 6 in place preparatory to vulcanization and taken along line 9-9 of FIG. 8;

DETAILED DESCRIPTION OF THE PREFERRED EMBODIMENT

Figure 1:
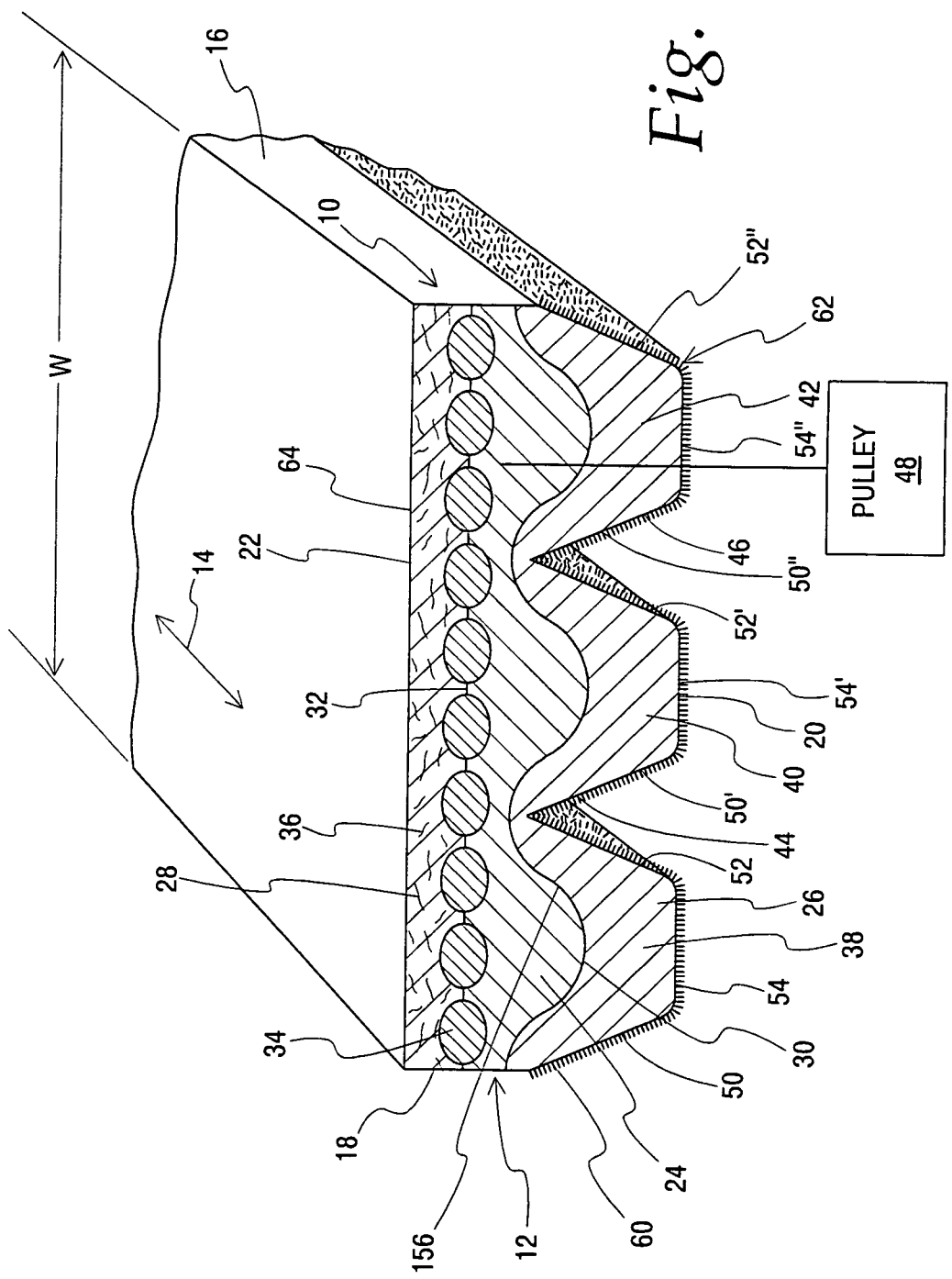
FIG. 1 is a cross-sectional, perspective view of a V-ribbed belt, made according to the present invention.

In FIG. 1, one form of power transmission belt, according to the present invention, is shown at 10. The belt 10 is a V-ribbed belt with a body 12 having a length, as indicated by the double-headed arrow 14, a width W between laterally spaced side surfaces 16, 18, an inside 20, and an outside 22.

The designations "inside" and "outside" are arbitrary, as the belt 10 may be configured so that these surfaces can be reversed in operation.

In this embodiment, the body 12 is defined by laminating a first layer 24, a second layer 26, and a third layer 28. The second layer 26 is laminated to the inside 30 of the first layer, with the third layer 28 laminated to the outside 32 of the first layer 24.

At least one load carrying member 34 is embedded in the first layer 24, which functions as a cushion rubber layer. The load carrying member 34 may be a continuous member with a plurality of laterally spaced turns, or individual members. For purposes of explanation herein, the load carrying member 34 will be considered as one continuous cord.

The load carrying member 34 defines the belt neutral axis, with the third layer 28 in tension and the second layer 26 in compression with the body 12 wrapped in a first configuration wherein the second layer 26 is on the inside of the belt 10.

The load carrying member 34 is typically formed of twisted threads. The load carrying member 34 is additionally pressed into the third layer 28. The third layer 28 has short reinforcing fibers 36 embedded therein in a randomly oriented manner.

A plurality, and in this case three, laterally spaced ribs 38, 40, 42, are formed in the second layer 26. The ribs 38, 40, 42 have the same cross-sectional shape, which is substantially a truncated triangular, or trapezoidal, shape. The ribs 38, 40, 42 are provided at equal, lateral intervals and are separated by V-shaped grooves 44, 46. The second layer 26 is pressurized to form the grooves 44, 46, as in a process hereinafter described.

The ribs 38, 40, 42 have exposed surfaces on the inside 20 of the body 12 to engage a complementarily-shaped pulley 48. Exemplary rib 38 has oppositely facing pulley-engaging side surfaces 50, 52 and a joining bottom surface 54. Like surfaces are provided on the ribs 40, 42 and are identified with corresponding reference numerals and "'" and "''", respectively.

The exposed side surfaces, 50, 52, 50', 52', 50'', 52'' define frictional force transmission surfaces and cooperate with complementarily-shaped surfaces (not shown) on the pulley 48.

Short fibers 60 are implanted on all of the rib surfaces 50, 52, 54, 50', 52', 54', 50'', 52'', 54'' to form a flocked layer 62. It is not necessary, however, that the flocked layer 62 be formed on the bottom surfaces 54, 54', 54''.

The first, second, and third rubber layers 24, 26, 28 have respectively first, second, and third rubber compositions made from rubber components that may be any one, or a combination of, natural rubber, butyl rubber, styrene butadiene rubber, chloroprene rubber, alkylated chlorosulfonated polyethylene, ethylene-α-olefin elastomer, hydrogenated nitrile rubber, mixed polymer of hydrogenated nitrile rubber and metal salt of unsaturated carboxylic acid, etc.

Of the above components, ethylene-α-olefin elastomer is preferred. That is because it has excellent ozone-proof, heat-resistant, and cold-resistant properties. Ethylene-α-olefin is also relatively low in price and satisfies dehalogenation.

Compared to other rubber materials, ethylene-α-olefin elastomer has low wettability, yet it greatly enhances power transmission capabilities and accounts for quiet operation in the presence of water, when incorporated as herein described.

Ethylene-α-olefin elastomer is a copolymer of ethylene and α-olefin such as propylene, butene, hexane, octene, or the like, or a copolymer of ethylene, α-olefin and nonconjugated diene. The diene component may be nonconjugated diene of 5 to 15 in number of carbon atoms, such as ethylidene norbornene, dicyclopentadiene, 1,4-hexadiene, cyclooctadiene, ethylene norbornene, or the like. For example, ethylene-propylene rubber (EPM), ethylene-propylene-diene copolymer (EPDM), or the like, may be used as the ethylene-α-olefin elastomer. EPDM is more frequently used. EPDM having an iodine number of 3 to 40 is preferable.

When the iodine number is less than 3, the vulcanization of the rubber composition may be insufficient. The resulting belt is prone to abrasion and/or adhesion problems. When the iodine number exceeds 40, the scorch of the rubber composition may be shortened, and may thus be difficult to handle. The heat resistance performance is also likely to be compromised.

In the second rubber layer 26, in which the ribs 38, 40, 42 are formed, ethylene-α-olefin elastomer is an important component. Plasticizer and solid lubricant are blended and used in the ethylene-α-olefin elastomer.

A material having a solubility parameter (Solubility Parameter: SP value) of 8.3 to 10.7 $(cal/cm^3)^{1/2}$ is used for the plasticizer. A plasticizer having an SP value of 8.3 $(cal/cm^3)^{1/2}$ or more has a larger SP value than that of ethylene-α-olefin elastomer. A plasticizer having an SP value of 8.3 $(cal/cm^3)^{1/2}$ or more is provided in the ethylene-α-olefin elastomer, whereby the plasticizer can be bled onto the surfaces of the ribs 38, 40, 42 formed with this rubber composition.

When the SP value exceeds 10.7 $(cal/cm^3)^{1/2}$, the compatibility thereof with ethylene-α-olefin elastomer is greatly reduced, and it is difficult to uniformly disperse the plasticizer into the rubber composition in a kneading process. As a result, workability may be lowered. The SP value is determined from the formula SP=dΣG/M, where: d=density; G=molecular attraction constant; and M=molecular weight.

For example, a plasticizer of ether type, ester type, ether ester type, phthalic acid derivative type, adipic acid derivative type, sebacic acid derivative type, trimellitic acid derivative type or phosphoric acid derivative type may be used as the plasticizer whose SP value ranges from 8.3 to 10.7 $(cal/cm^3)^{1/2}$. Of these materials, the ether ester type plasticizer is preferably used because it has an appropriate bleed effect and excellent wettability with water.

The method of manufacturing the ether ester type of plasticizer is not limited. However, it is easily obtained by reacting 2-ethylhexyl acid and ether glycol in a mole ratio of 2:1. For example, it can be obtained by reacting mixed ether glycol containing a required amount of pentaethylene glycol, hexaethylene glycol, heptaethylene glycol, or the like, with 2-ethylhexyl acid.

The ether ester type plasticizer can also be manufactured by mixing polyethylene glycol using diester obtained by individually reacting pentaethylene glycol, hexaethylene glycol or heptaethylene glycol with 2-ethylhexyl acid so that the degree of polymerization is in the range of 5 to 10. "Adekacizer RS-107", "Adekacizer RS-735", "Adekacizer RS-700", etc., produced by Asahi Denka Kogyo K. K., are sold as such ether ester type plasticizers in the commercial market.

The average molecular weight of the ether ester type plasticizer preferably ranges from 200 to 2000. If the average molecular weight is within this range, its bleed performance is adequate and it has excellent wettability with water. To prevent volatilization in a high temperature environment, the average molecular weight is preferably equal to 300 or more.

The blending quantity of this plasticizer is set in the range of 5 to 25 parts weight (abbreviated pts.wt. in the detailed description and claims herein) to 100 pts.wt. ethylene-α-olefin elastomer. If the blending quantity of the plasticizer is less than 5 pts.wt., this quantity may be insufficient to make the plasticizer bleed out to cover the surfaces 50, 52, 50', 52', 50", 52". As a result, it may be difficult to obtain uniform wettability, whereby the lubricating effect may be inadequate.

In the event that the blending quantity of the plasticizer exceeds 25 pts.wt., the plasticizer may bleed excessively. As a result, there may be a detrimental reduction of the frictional coefficient between the frictional surfaces 50, 52, 50', 52', 50", 52" and the pulley. Abrasion resistance may also be significantly and detrimentally lowered.

Graphite, molybdenum disulfide, mica isinglass, talc, antimony trioxide, molybdenum diserenide, tungsten disulfide, polytetrafluoroethylene (PTFE), or the like, may be used as the solid lubricant. These materials may be used alone, or any two or more of these materials may be used in combination. Of these materials, graphite, molybdenum disulfide and polytetrafluoroethylene are preferable because they account for an excellent lubricating action that stabilizes the friction coefficient at a low level.

The blending quantity of the solid lubricant is set in the range of from 5 to 50 pts.wt. to 100 pts.wt. of ethylene-α-olefin elastomer. More preferably, this range is set from 5 to 30 pts.wt. In the event that the blending quantity of the solid lubricant is less than 5 pts.wt., the frictional coefficient between the rib surfaces 50, 52, 50', 52', 50", 52" and cooperating pulley 48 may not be varied significantly, as a result of which the suppression of sound may be inadequate. On the other hand, in the event that the blending quantity of the solid lubricant exceeds the above-noted range, the extensibility of the rubber may be lowered detrimentally, as a result of which the lifetime of the belt may be unacceptably shortened.

In addition to the plasticizer and the solid lubricant, sulphur and organic peroxide for cross-linkage of rubber are preferably blended in the rubber composition. The organic peroxide may be di-t-butyl peroxide, dicumlyperoxide, t-butyl cumlyperoxide, 1,1-t-butyl peroxy-3,3,5-trimethylcyclohexane, 2,5-dimethyl-2,5-di(t-butylperoxy)hexane, 2,5-dimethyl-2,5 (t-butylperoxy)hexane, 2,5-dimethyl-2,5-di(t-butylperoxy) hexane-3,bis(t-butyleperoxy di-isopropyl)benzene, 2,5-dimethyl-2,5-di(benzoylperoxy)hexane, t-butylperoxybenzoate, t-butylperoxy-2-ethyl-hexylcarbonate, or the like. Organic peroxide is used in an amount preferably from 1 to 8 pts.wt. to 100 pts.wt. of the rubber component.

A vulcanization accelerator may be blended in the rubber composition. Suitable vulcanization accelerators are thiazole type, thiuram type or sulfenic amide type. Suitable thiazole type vulcanization accelerators are 2-mercaptobenzothiazole, 2-mericaptothiazoline, dibenzothiazyl/disulfide, zinc salt of 2-mercaptobenzothiazole, or the like. Suitable thiuram type vulcanization accelerators are tetramethyl thiuram/monosulfide, tetramethyle thiuram/disulfide, tetraethyl thiuram/disulfide, N,N'-dimethyl-N,N'diphenylthiuram/disulfide, or the like. Suitable sulfenic amide type vulcanization accelerators are N-cyclohexyl-2-benzothiazylsulfenic amide, N,N'-cyclohexyl-2-benzothiazylsulfenic amide, or the like. Bismaleimide, ethylene thiourea may also be used. These vulcanization accelerators may be used alone or any two or more thereof may be used in combination.

The degree of cross-linkage is increased by blending a co-agent in the rubber composition to prevent occurrence of problems such as adhesive abrasion, etc. Suitable co-agent materials for organic peroxide cross-linkage are TAIC, TAC, 1,2-polybutadiene, metallic salt of unsaturated carboxylic acid, p-benzoquinone dioxime, p,p'-dibenzoquinone dioxime, tetrachlorobenzoquinone poly(p-dinitrobenzoquinone), guanidine, trimethyrolpropane trimethacrylate, ethyleneglycol dimethacrylate, N—N'-m-phenylene bismaleimide, sulphur, or the like. Of these materials, N—N'-m-phenylene bismaleimide or quionone dioxime group are preferable.

When N—N'-m-phenylene bismaleimide is used as the co-agent, there is an advantage that the degree of cross-linkage may be increased. Thus, abrasion resistance is enhanced, so that the difference between the power transmission performance with water pouring on the system and the power transmission performance under dry conditions is reduced.

When the quinine dioxime group is selected, there is an advantage that the degree of adhesion to the fibers is enhanced.

The blending quantity of the co-agent is preferably in the range of 0.5 to 10 pts.wt. per 10 pts.wt. of rubber. When this blending quantity is less than 0.5 pts.wt., the improved effect is not appreciable. When the blending quantity exceeds 10 pts.wt., the resistance to tearing forces and adhesive forces may be lowered.

In addition to the above-described materials, other material used normally for rubber blending may be added to the rubber composition. These may be any one or more of enhancing agents such as carbon black, silica, or the like, filler, other plasticizers, stabilizers, processing materials, coloring agents, or the like.

It is preferred that fibers, such as short reinforcing fibers or the like, not be blended into the rubber composition in the second layer 26. Typically short fibers are provided in ribs on such V-ribbed belts. However, by eliminating the short fibers in the rubber layer 26, the plasticizer is permitted to bleed readily onto the surfaces 50, 52, 50', 52', 50", 52", without the fibers blocking migration of the plasticizer. Further, by eliminating short fiber content in the ribs 38, 40, 42, the overall lifetime of the belt may be maintained, whereas these fibers may otherwise account for shortening of the belt life.

The rubber composition defining the second rib/layer 26 and containing ethylene-α-olefin elastomer, may be used to form the first/cushion rubber layer 24. However, the plasticizer having the solubility coefficient of 8.3 to 10.7 $(cal/cm^3)^{1/2}$, which is blended in the rubber composition in the second layer 26, preferably is not blended into the rubber composition in the first layer 24. Even if the plasticizer were provided in the first layer 24, plasticizer therein would not bleed to the frictional surfaces, 50, 52, 50', 52', 50", 52" on the ribs 38, 40, 42, so as to have any effect on belt operation. Thus, it is unnecessary, particularly from the standpoint of cost, to use the plasticizer in the first/cushion rubber layer 24.

The rubber composition used to form the second layer 26, including the ethylene-α-olefin elastomer, can be used to form the rubber composition in the third/extensible layer 28. However, it is preferable to blend the aforementioned short fibers 36 into the rubber composition of this layer 28. When the short fibers 36 are provided in this layer in a randomly oriented fashion, the layer 28 will have good mechanical strength. Further, the fibers 36 reduce the adhesiveness of the surface 64 on the outside 22 of the belt body 12. An exemplary method of manufacturing the V-ribbed power transmission belt 10 will now be described.

Figure 2:
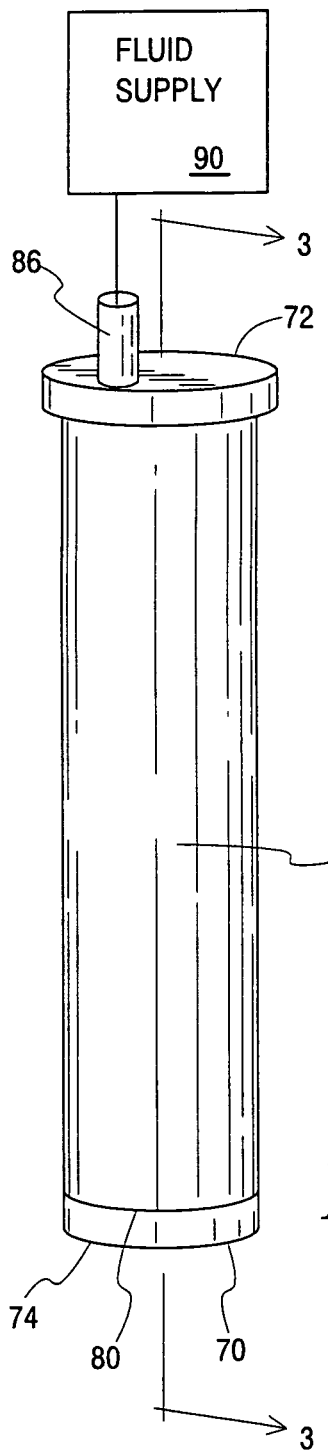
FIG. 2 is a perspective view of a metal/inner mold with a surrounding bladder that can be used to form the belt in FIG. 1.
Figure 3:
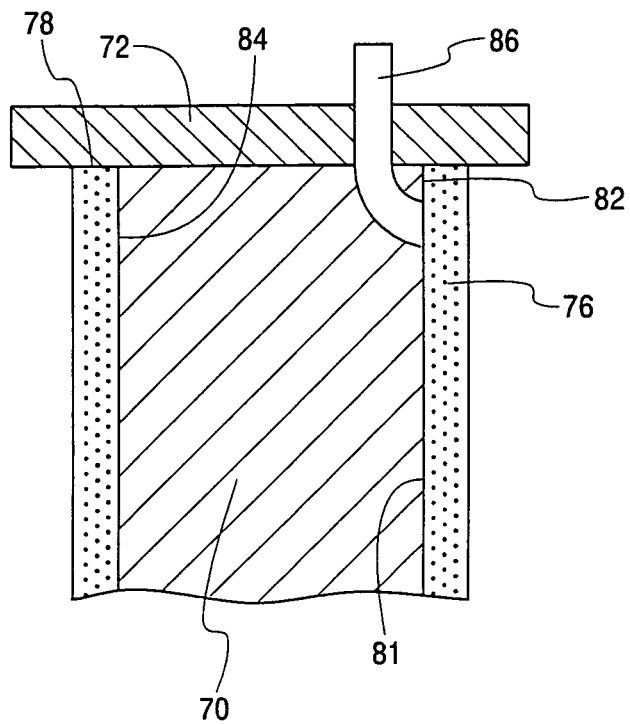
FIG. 3 is an enlarged, partial, cross-sectional view of the metal/inner mold and bladder taken along line 3-3 of FIG. 2.

In FIGS. 2 and 3, a metal mold 70 is used as an inner mold. The metal/inner mold 70 is designed with a columnar, or cylindrical, shape and has enlarged flanges 72, 74, respectively at the upper and lower end faces thereof. The flanges 72, 74 have a circular shape so as to extend outwardly from the inner mold 70 fully around its periphery.

A bladder 76 surrounds the inner mold 70 and is formed from a material that can freely expand and contract. The bladder 76 is preferably made from material that is generally airtight, such as rubber. The upper and lower bladder ends 78, 80 abut flushly to the flanges 72, 74. The gap/interface 81 between the outer periphery 82 of the inner mold 70 and the inner periphery 84 of the bladder 72 is hermetically sealed at the bladder ends 78, 80.

The inner mold 70 is provided with a fluid supply passage 86 that projects through the upper flange 72. The supply passage 86 extends through the upper end of the inner mold 70 and opens to the outer peripheral surface 82 to the gap/interface 81 between that surface 82 and the inner periphery 84 of the bladder 76.

Fluid, such as air, or the like, is delivered from a supply 90 through the supply passage 86 to the gap/interface 81. This fluid, delivered under pressure, expands the bladder 76 radially outwardly to a swollen condition between the end locations that are hermetically sealed. With no fluid delivered from the supply 90, the bladder 76 contracts to closely surround the inner core 70.

As seen clearly in FIGS. 4 and 5, an unvulcanized rubber sheet 94, with a composition to define the third/extensible layer 28, is wound around the outer periphery 96 of the bladder 76 over the inner mold 70. The load carrying member/cord 34 is then spirally wrapped around the sheet 94. Thereafter, a separate, unvulcanized rubber sheet 98, with a composition to define the second/cushion rubber layer 24, is wound around the load carrying member/cord 34. An unvulcanized rubber sheet 100, having the composition of the second layer 26, is then wrapped around the rubber sheet 98. The resulting structure is a cylindrical belt sleeve 102 consisting of the rubber sheets 94, 98, 100 and load carrying member/cord 34.

Figure 6:
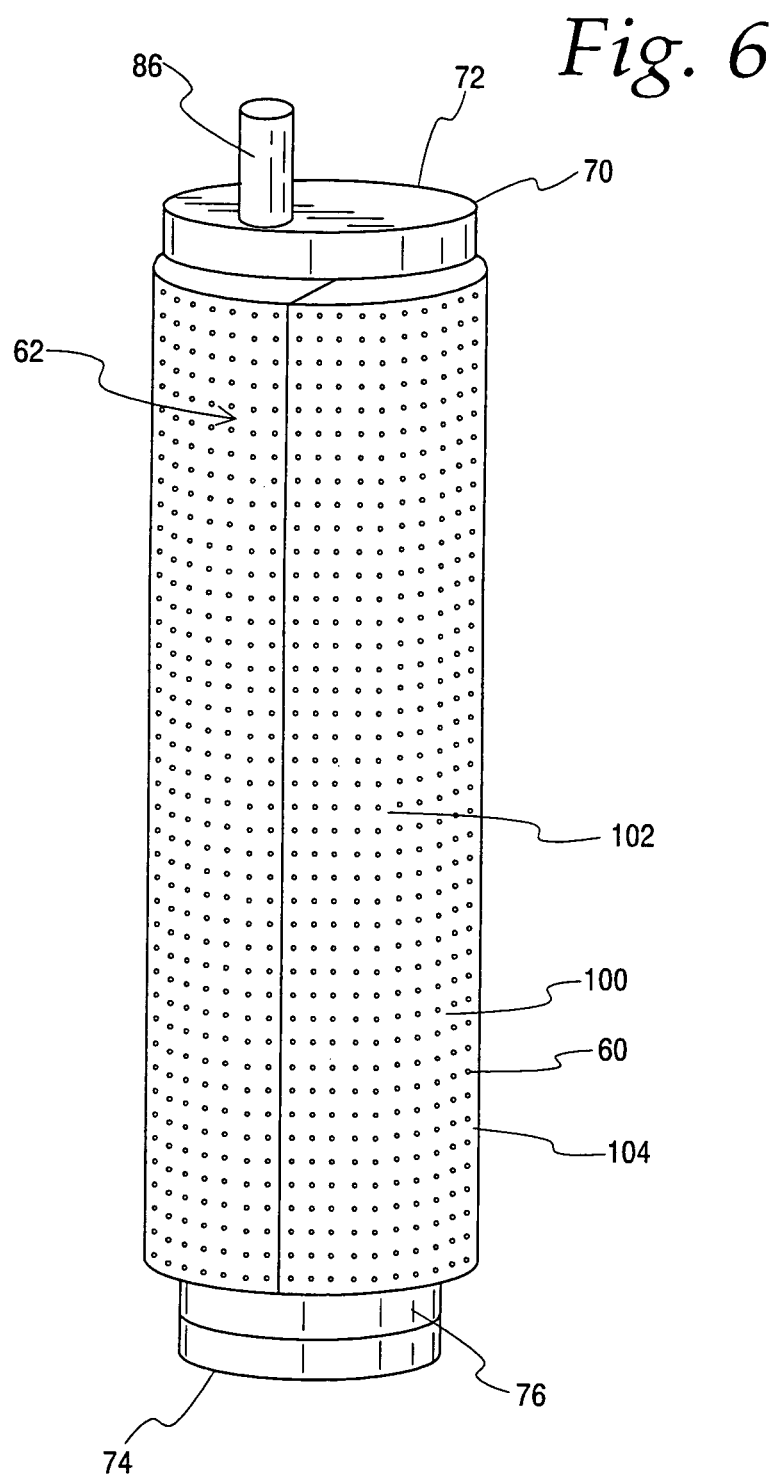
FIG. 6 is an enlarged, perspective view of the metal/inner mold and bladder, with the belt sleeve thereon as in FIG. 4, and with short fiber applied as a flocked layer.

As shown in FIG. 6, after the unvulcanized belt sleeve 102 is formed on the inner mold 70, as described above, the short fibers 60 are implanted on the whole outer surface 104 of the belt sleeve 102, thereby forming the flocked layer 62.

The short fibers 60 are not limited to any specific construction or composition. Suitable fibers are those made from rayon, cotton, polyester, polyamide, aramid, vinylon, carbon, polytetrafluoroethylene, or the like. Polyamide fiber is preferred from amongst this group.

By forming the flocked layer 62 from polyamide short fibers, the coefficient of friction between the rib surfaces 50, 52, 50', 52', 50", 52" and cooperating pulley 48 can be lowered, while abrasion resistance is enhanced. Further, the suppression of sound generation caused by component misalignment in a dry state may be enhanced.

The short fibers 60 preferably have a length in the range of 0.05 to 2.5 mm. More preferably, this range is from 0.1 to 2.0 mm. Even more preferably, the range is from 0.2 to 1.0 mm. The diameter of the short fibers 60 is preferably set in the range of 3 to 80 μm and more preferably in the range of 5 to 70 μm. An even more preferable range is from 10 to 30 μm. The aspect ratio (length/diameter) of the short fibers 60 is preferably in a range from 30 to 300. The implantation density of the short fibers 60 is preferably in the range of 10,000 to 50,000 fibers/cm². Of course, the above parameters are not limiting in nature.

The short fibers 60 may be implanted on the outer surface 104 of the rubber sheet 100 on the belt sleeve 102 as by using a well-known electrostatic implanting device using a known electrostatic implanting procedure, as shown in block diagram form in FIG. 7. More specifically, the metal/inner mold 70 is placed upon a rotatable table, as shown at block 106. As shown at block 108, a spray nozzle, that is movable along the lengthwise/axial direction of the inner mold 70, is disposed to face the outer surface 104 of the belt sleeve 102. A water-type adhesive agent is coated, using the spray nozzle, over the outer surface 104 as the inner mold 70 is rotated by the table.

As a result, an adhesive film is formed on the outer surface 104 of the belt sleeve 102.

Suitable water-type adhesive agents are urethane type emulsion, acrylic type emulsion, vinyl acetate type emulsion, styrene type emulsion, or the like. Thereafter the short fibers 60 are adhesively attached to the outer surface 104 using a short fiber coater, which is movable along the axial/lengthwise direction of the inner mold 70 as the same is rotated through the table.

More particularly, as indicated at block 110, the fibers 60 are electrified and attached to the outer surface 104. To accomplish this, the metal/inner mold 70 is grounded and a voltage is applied to an electrode plate provided to the coater to produce an electric field. When the short fibers 60, which are subjected to an electrodeposition treatment, are supplied to the electrode plate of the short fiber coater, the short fibers 60 are electrified and, through electrostatic forces from the electric field, propelled to impinge against the outer surface 104 of the belt sleeve 102 and are adhered thereto through the film defined by the adhesive agent 108. The electrodeposition treatment is controlled by adjusting the leakage resistance value and moisture of the short fibers 60 to enhance their movement between the coater and the outer surface 104.

Once the short fibers 60 are adhered to the outer surface 104 of the belt sleeve 102, the water-type adhesive agent is dried as shown at block 112, either naturally or by elevating the temperature thereof. As a result, the short fibers 60 become firmly fixed to the outer surface 104 of the sheet 100 of the belt sleeve 102, thereby resulting in the flocked layer 62 formation.

While in this particular method, the short fibers 60 are implanted on the outer surface 104 of the belt sleeve 102 after it is mounted upon the metal/inner mold 70, the fibers 60 may be implanted upon the sheet 100 before the sheet 100 is incorporated into the belt sleeve 102. This can be accomplished by directly wrapping the sheet 100 around the metal/inner mold 70.

The belt sleeve 102, with the flocked layer 62 formed thereon as shown in FIG. 6, can then be vulcanized using a vulcanizing mold 118 as an outer mold component, as shown in FIG. 8. The vulcanizing mold 118 has a cylindrical shape with a top opening 120. The vulcanizing mold 118 is shown in further detail additionally in FIGS. 9-11. The vulcanizing mold 118 has concentric, cylindrical, inner and outer walls 122, 124 that define an hermetically sealed heating/cooling jacket 126 around the central axis 128 thereof.

The heating/cooling jacket 126 is in communication with a supply of heating medium 130 through a passage 132. The heating medium may be steam, or the like. The heating/cooling jacket 126 is in communication with a cooling medium supply 134 through a separate conduit/passage 136. The cooling medium may be water, or the like. Through this arrangement, the vulcanizing mold 118 can be selectively heated and cooled.

Convex shaping portions 140 are provided on the inwardly facing surface 142 of the inner wall 122 of the vulcanizing mold 118. These convex portions 140 extend continuously around the axis 128 and are at regularly spaced height/axial intervals on the vulcanizing mold 118. Each of the convex portions 140 defines a ring shape, around the axis 128, that is substantially orthogonal to the axis 128.

Figures 10, 11:
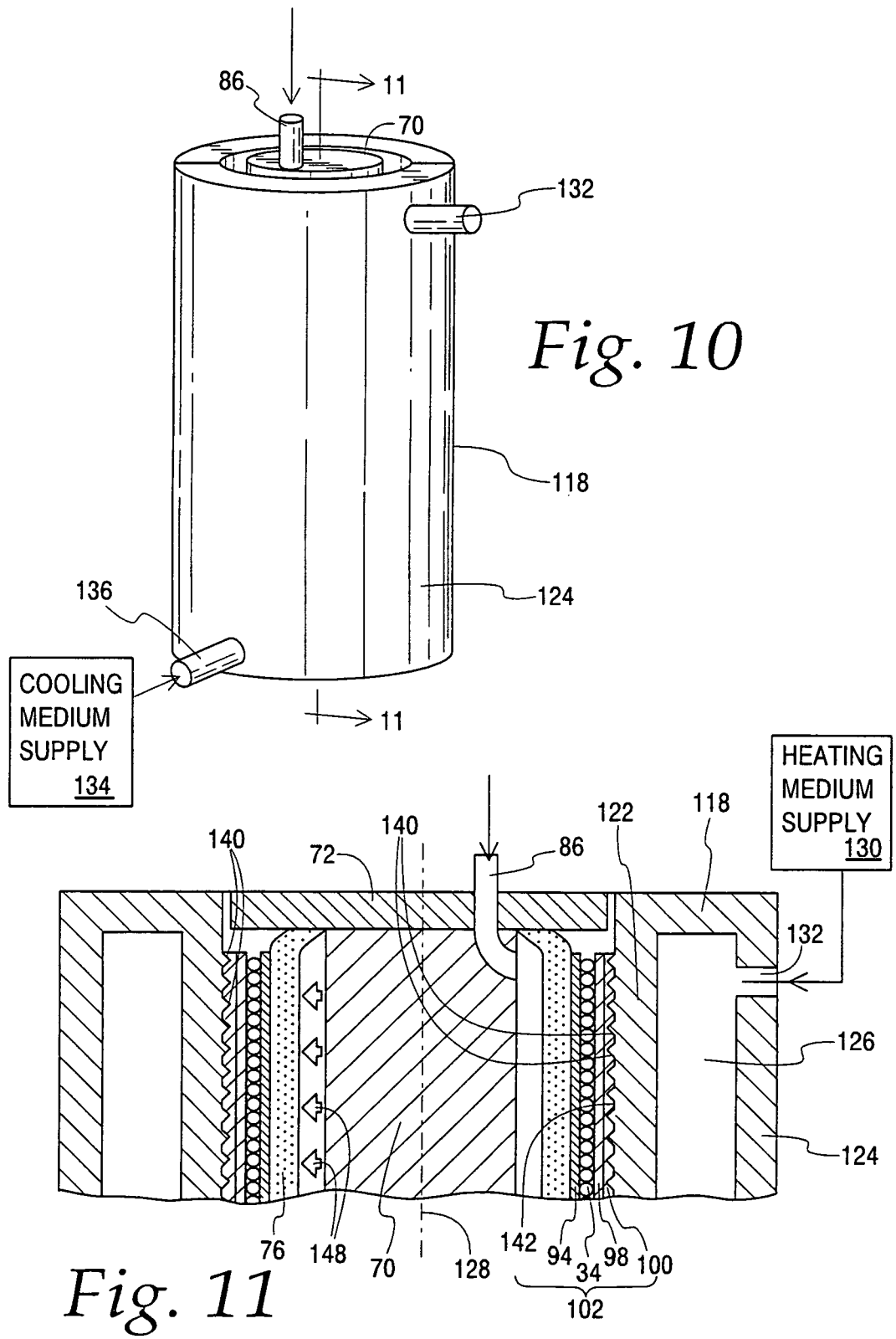
FIG. 10 is a view as in FIG. 8 wherein the subassembly is directed fully into the vulcanizing mold.
FIG. 11 is an enlarged, partial, cross-sectional view of the vulcanizing mold and subassembly of FIG. 6 wherein the belt sleeve with the flocked layer is pressed against a forming surface on the vulcanizing mold, to which the belt sleeve is conformed.

The entire subassembly, made up of the metal/inner mold 70 with the unvulcanized belt sleeve 102 with the flocked layer 62 formed thereon as in FIG. 6, is directed through the top opening 120 into a vulcanizing chamber 144, in an axial direction, as indicated by the arrow 146 in FIG. 8, ultimately to the position shown in FIGS. 9-11. Pressurized fluid, such as air, from the supply 90, is delivered through the fluid supply passage 86 to the gap/interface 81 between the inner mold 70 and bladder 76 while heating medium is delivered from the supply 130 through the passage 132 into the heating/cooling jacket 126. As a result, the bladder 76 swells and expands radially outwardly from the air pressure, as indicated by the arrows 148. As this occurs, the surrounding belt sleeve 102 is pressed against the inner peripheral surface 142 of the vulcanizing mold 118. The belt sleeve is thus forced under pressure between the bladder 76 and the surface of the vulcanizing mold 118 while being heated through the heating medium introduced to the heating/cooling jacket 126. Vulcanization is thereby carried out. As the belt sleeve 102 is forced radially outwardly to against the convex portions 140 on the surface 142, the belt sleeve 102 conforms thereto. That is, the convex portions 140 press into the outer surface 104 of the belt sleeve 102, thereby forming the grooves 44, 46.

To carry out the vulcanizing/shaping process, heat and pressure are controlled, with the former in the range of 120 to 170° C. and the latter from 0.5 to 1.5 MPa. This process is carried out for fifteen to thirty minutes.

Figure 12:
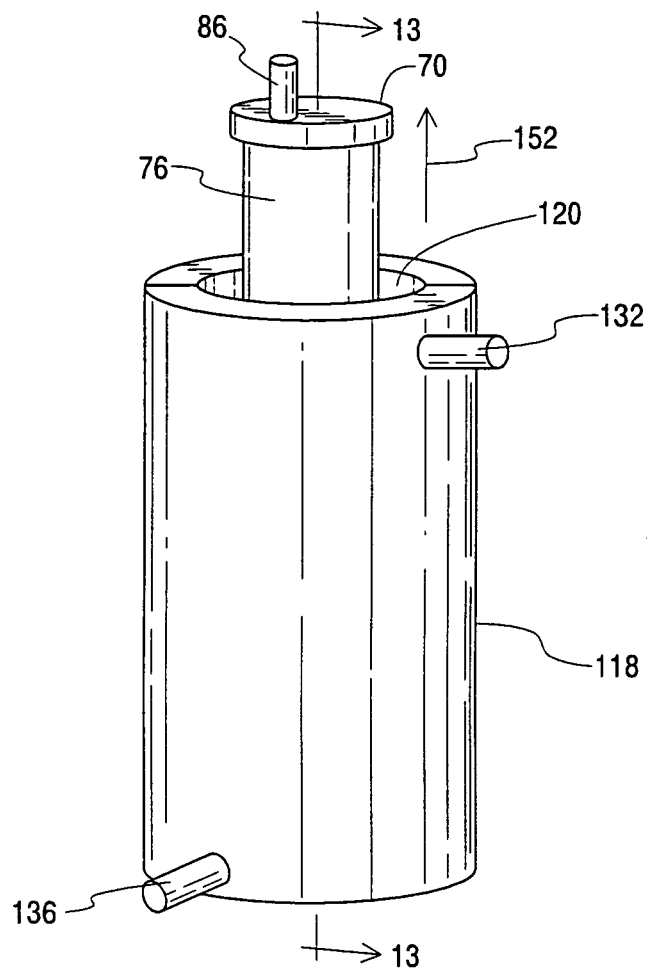
FIG. 12 is a view as in FIG. 10 wherein the metal/inner mold and bladder are being separated from the vulcanized belt sleeve within the vulcanizing mold.
Figure 13:
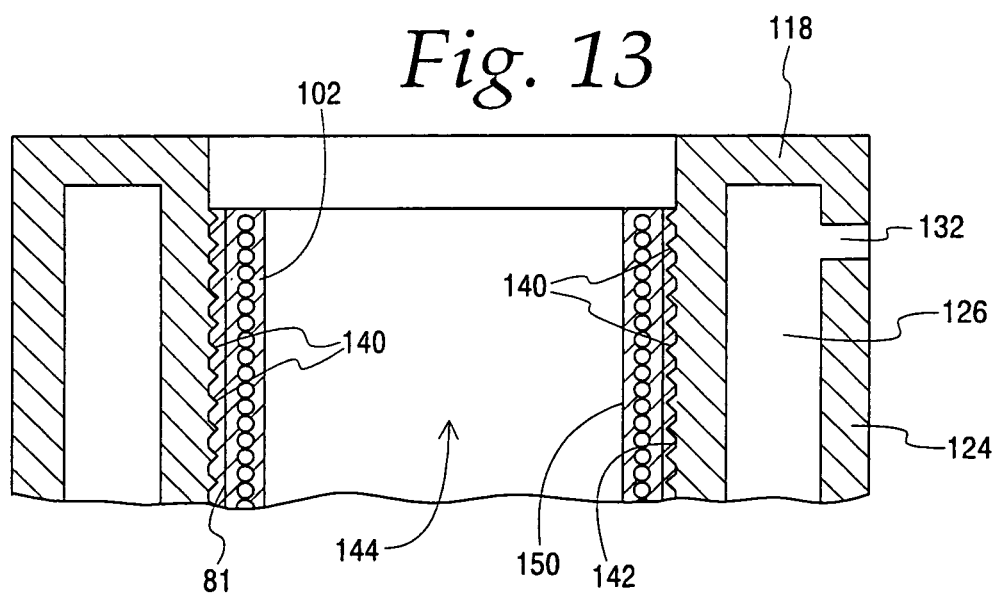
FIG. 13 is an enlarged, partial, cross-sectional view of the upper region of the vulcanizing mold with the metal/inner mold and bladder removed and with the vulcanized belt sleeve still in place and taken along line 13-13 of FIG. 12.

After the vulcanization/shaping process is completed, as shown in FIGS. 12 and 13, the delivery of pressurized fluid from the supply 90 is halted, whereupon the bladder 76 contracts and returns to its original state, as shown in FIGS. 2 and 3. A cooling medium is delivered from the supply 134 (FIG. 10) through the passage 136 and into the heating/cooling jacket 126 to cool the vulcanizing mold 118. Once the bladder 76 contracts, it is reduced in outer diameter sufficiently that it can be separated from the inner diameter 150 of the vulcanized belt sleeve 102, as seen in FIGS. 12 and 13. This allows the inner mold 70 to be drawn upwardly, in the direction of the arrow 152, out of the top opening 120. The vulcanized belt sleeve 102 remains with the vulcanizing mold, conformed to the surface 142.

Thereafter, the temperature of the vulcanized belt sleeve 102 is reduced to an appropriate mold-detachment temperature within the cooled vulcanizing mold 118. In this state, the belt sleeve 102 can be separated from the surface 142 and removed from the vulcanization chamber 144 through movement in the direction of the arrow 154 in FIG. 14.

Thereafter, the vulcanized belt sleeve 102 is cut to widths corresponding to the width W of the belt 10, as shown in FIG. 1.

Through this method, the first, second, and third rubber layers 24, 26, 28 are formed by vulcanizing the rubber sheets 98, 100, 94, successively. The rubber layer 26 is provided with the V-shaped grooves 44, 46 extending along the belt length by forcibly pressing the rubber layer 26 against the convex portions 140 of the vulcanizing mold 118. The ribs 38, 40, 42 are formed through this process with the configuration depicted in FIG. 1. The flocked layer 62 of short fibers 60 is formed on the outer peripheral surface 104 of the rubber sheet 100, and thus the surfaces 50, 52, 54, 50', 52', 54', 50", 52", 54", formed by vulcanizing and shaping the rubber sheet 100, are covered by the flocked layer 62.

Pressurization using the convex portions 140 on the surface 142 is carried out to form the grooves 44, 46, as a result of which the boundary layer 156 (FIG. 1), between the cushion rubber layer 24 and second rubber layer 26, has a non-planar shape with a wave pattern so that the first/cushion rubber layer 24 bites into the second rubber layer 26 in which the ribs 38, 40, 42 are formed. That is, the ribs 38, 40, 42 are formed by shaping the grooves 44, 46 through the vulcanization/shaping process described above. Thus, it is unnecessary to cut or grind the second layer 26 to define the ribs 38, 40, 42 and grooves 44, 46. No material needs to be removed from the second layer 26 during this process. As a result, the number of cutting steps can be reduced. Additionally, material waste and disposal problems are obviated since no material is removed from the second layer 26 to form the grooves 44, 46 and ribs 38, 40, 42.

With the V-ribbed belt 10 manufactured as described above, the second rubber layer 26, having the flocked layer 62, is made from a rubber composition in which the plasticizer, having the solubility coefficient of 8.3 to 10.7 (cal/cm$^3$)$^{1/2}$, and the solid lubricant are blended in ethylene-α-olefin elastomer as described above. The plasticizer, with the solubility coefficient higher than that of the ethylene-α-olefin elastomer, bleeds to the surfaces 50, 52, 50', 52', 50", 52" of the ribs 38, 40, 42 at all times.

Thus, when the belt 10 is run while suspended between spaced pulleys, the rib surfaces 50, 52, 50', 52', 50", 52" and cooperating pulley surfaces have a reduced coefficient of friction by reason of the action of the plasticizer, with the system in a dry state and over a normal running time. Thus, the generation of abnormal sound may be minimized so that quiet operation results.

Further, with the operating system exposed to water, the uniform wettability of the rib surfaces 50, 52, 54, 50', 52', 54', 50", 52", 54" can be effected while stabilizing the friction coefficient between those surfaces and the cooperating pulley 48. As a result, belt slipping can be suppressed while enhancing power transmission performance.

At the same time, when the blended quantity of plasticizer is less than 5 pts.wt. per 100 pts.wt. ethylene-α-olefin elastomer, the quantity of plasticizer may not be adequate to bleed to cover the rib surfaces 50, 52, 54, 50', 52', 54', 50", 52", 54" to allow uniform wettability. As a result, the lubricating effect of the plasticizer may not be adequate to expect any significant improved performance, as set forth above.

When the blending quantity of the plasticizer exceeds 25 parts weight, the bleeding of the plasticizer is excessively large, whereupon the coefficient of friction between the belt surfaces 50, 52, 50', 52', 50", 52" and pulley 48 may be significantly reduced. Additionally, abrasion resistance may be significantly lowered.

As noted, the friction coefficient between the ribs 38, 40, 42 and cooperating pulley 48 may be reduced by the addition of solid lubricant. Solid lubricant may contribute significantly to quiet performance and power transmission capability. As the running time for the belt increases and the amount of plasticizer that bleeds diminishes, the friction coefficient between the belt ribs 38, 40, 42 and cooperating pulley 48 can be stabilized at an acceptably low level by the action of the solid lubricant. Additionally, the enhanced quiet performance and power transmission capabilities can be maintained over a long period.

When the blending quantity of the solid lubricant to ethylene-α-olefin elastomer is less than 5 pts.wt. per 100 pts.wt., the enhancement to the quiet performance and improved transmission capabilities may not be obtained to any appreciable degree.

Additionally, the flocked layer 62 on the ribs 38, 40, 42 causes the coefficient of friction between the ribs 38, 40, 42 and cooperating pulley 48 to be reduced. Abnormal sound can be suppressed under a normal dry running state. Additionally, abrasion resistance on the rib surfaces 50, 52, 50', 52', 50", 52" can be enhanced.

In an exemplary form, the thickness of the rubber sheet 100 that defines the second layer 26 is preferably in the range of 0.3 to 2.0 mm. When the thickness of this rubber sheet exceeds 2.0 mm, the thickness of the cushion rubber layer 24 is reduced by that same amount. The adherence of the load carrying cord 34 is thus lowered so that the overall durability of the belt 10 may be reduced.

When the thickness of the rubber sheet 100 is less than 0.3 mm, and thus the second layer 26 is thinner, the amount of plasticizer having the solubility coefficient of 8.3 to 10.7 (cal/cm$^3$)$^{1/2}$ in the second layer 26 is also reduced by that same amount. As a result, the amount of plasticizer that bleeds to the exposed rib surfaces 50, 52, 54, 50', 52', 54', 50", 52", 54" is reduced. As a result, there may not be an adequate enhancement of noise suppression and power transmission capabilities.

Generally, a V-ribbed belt, according to the invention, can be made to avoid sound generation attributable to slippage. Excellent power transmission capabilities are possible, while maintaining good flexibility and other operating characteristics, even in relatively high and low temperature environments.

The effectiveness of the present invention will now be described with respect to testing and comparison to other sample belts.

Inventive Embodiments 1-8 and Comparative Examples 1-3 and 5

The rubber composition shown in Table 1, below, was kneaded using a Banbury mixer, and extended under pressure by a calendar roll, thereby producing the rubber sheet 94, making up the third (extensible) rubber layer 28, with a thickness of 0.8 mm.

TABLE 1

BLEND TABLE FOR THIRD (EXTENSIBLE) RUBBER LAYER (Pts. Wt.)

| | |
|---|---|
| EPDM POLYMER *1 | 100 |
| ZnO | 5 |
| STEARIC ACID | 1 |
| CARBON HAF | 80 |
| ANTI-OXIDANT | 2 |
| NYLON FLOCK (FIBER LENGTH ABOUT 0.5 MM) | 20 |
| ORGANIC PEROXIDE *2 | 5 |

*1: DU PONT - DOW ELASTOMER JAPAN CO., LTD "IP3640", MOONEY VISCOSITY 40 (100°)
*2 "PERKADOX14rp" produced by Kayaku Akzo Corporation The rubber composition shown in Table 2, below, was kneaded using the Banbury mixer, and extended under pressure by a calendar roll, thereby producing the rubber sheet 98, making up the first (cushion) rubber layer 24, with a thickness shown in Table 3, below.

TABLE 2

BLEND TABLE FOR FIRST (CUSHION) RUBBER LAYER (Pts. Wt.)

| | |
|---|---|
| EPDM POLYMER *1 | 100 |
| ZnO | 5 |
| STEARIC ACID | 1 |
| CARBON HAF | 80 |
| ANTI-OXIDANT | 2 |
| PARAFFIN TYPE SOFTENER *3 | 10 |
| ORGANIC PEROXIDE *2 | 5 |

*3: "DIANA PROCESS OIL" produced by Idemitsu Kosan Co., ltd., SP value 7.3.

TABLE 3

|  |  | Inventive Embodiments | | | | | | | | Comparative Examples | | | | |
| --- | --- | --- | --- | --- | --- | --- | --- | --- | --- | --- | --- | --- | --- | --- |
|  |  | 1 | 2 | 3 | 4 | 5 | 6 | 7 | 8 | 1 | 2 | 3 | 4 | 5 |
| Blending Quantity of Plasticizer *7 | | 10 | 10 | 10 | 5 | 25 | 10 | 10 | 10 | — | 10 | — | 10 | — |
| Blending Quantity of Solid Lubricant *8 | | 5 | 20 | 30 | 20 | 20 | 20 | 20 | 20 | — | — | 20 | 20 | 20 |
| Thickness (mm) of Rubber Sheet for Cushion Rubber Layer | | 1.5 | 1.5 | 1.5 | 1.5 | 1.5 | 1.5 | 2.0 | 0.5 | 1.5 | 1.5 | 1.5 | — | 1.5 |
| Thickness (mm) of Rubber Sheet for Rib Rubber (Second) Layer | | 1.0 | 1.0 | 1.0 | 1.0 | 1.0 | 1.0 | 0.5 | 2.0 | 1.0 | 1.0 | 1.0 | 2.5 | 1.0 |
| Friction Coefficient | Dry | 1.40 | 1.30 | 1.10 | 1.30 | 1.00 | 1.00 | 1.00 | 1.00 | 1.70 | 1.50 | 1.50 | 1.30 | 1.30 |
|  | Wet | 0.70 | 0.70 | 0.70 | 0.90 | 0.50 | 0.50 | 0.50 | 0.50 | 1.00 | 0.90 | 0.80 | 0.70 | 0.70 |
| Resistance to Sound Emission | Dry | 4 | 5 | 5 | 5 | 5 | 5 | 4 | 5 | 1 | 2 | 4 | 5 | 4 |
|  | Wet | 4 | 5 | 5 | 4 | 5 | 4 | 4 | 5 | 1 | 1 | 2 | 5 | 2 |
| Heat Resistance and Decay Durability | (hr) | 400 | 400 | 350 | 400 | 300 | 300 | 400 | 300 | 400 | 400 | 400 | 10 | 350 |

*7, *8: pts. wt. to EPDM polymer of 100 pts. wt.

The rubber composition shown in Table 4, below, was kneaded using the Banbury mixer, and extended under pressure by a calendar roll, thereby producing the rubber sheet 100, making up the second (rib rubber) layer 26, with a thickness shown in Table 3, above.

TABLE 4

| Blend Table For Rib Rubber Layer (Pts. Wt.) | Inventive Embodiments | | | | | | | | Comparative Examples | | | | |
| --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 |
| EPDM Polymer *1 | 100 | 100 | 100 | 100 | 100 | 100 | 100 | 100 | 100 | 100 | 100 | 100 | 100 |
| ZnO | 5 | 5 | 5 | 5 | 5 | 5 | 5 | 5 | 5 | 5 | 5 | 5 | 5 |
| Stearic Acid | 1 | 1 | 1 | 1 | 1 | 1 | 1 | 1 | 1 | 1 | 1 | 1 | 1 |
| Carbon HAF | 80 | 80 | 80 | 80 | 80 | 80 | 80 | 80 | 80 | 80 | 80 | 80 | 80 |
| Anti-Oxidant | 2 | 2 | 2 | 2 | 2 | 2 | 2 | 2 | 2 | 2 | 2 | 2 | 2 |
| Ether Ester Type Plasticizer *4 | 10 | 10 | 10 | 5 | 25 | — | 10 | 10 | — | 10 | — | 10 | — |
| DOA *5 | — | — | — | — | — | 10 | — | — | — | — | — | — | — |
| Solid Lubricant *6 | 5 | 20 | 30 | 20 | 20 | 20 | 20 | 20 | — | — | 20 | 20 | 20 |
| Paraffin Type Softener *3 | — | — | — | — | — | — | — | — | — | — | — | — | 10 |
| Organic Peroxide *2 | 5 | 5 | 5 | 5 | 5 | 5 | 5 | 5 | 5 | 5 | 5 | 5 | 5 |

*4: "RS-700" produced by Adeka Corporation, SP value 8.5, viscosity 30 cp (20° C.)

*5: Plasticizer "DOA" produced by Kyowa Hakko Kogyo Co., Ltd., SP value 8.8, viscosity 14 cp (20° C.)

*6: Artificial Graphite Powder "AT No. 20" produced by Oriental Industries Co., Ltd., average particle size 8 μm As shown in FIGS. 4 and 5, the rubber sheet 94 was wound around the outer periphery of the bladder 76 of the metal/inner mold 70, and the load carrying member/cord 34, in the form of a polyester fiber cord, was spirally wound on the rubber sheet 94. The rubber sheet 98 and, thereafter, the rubber sheet 100, were wound over the load carrying cord/member 34 to complete the belt sleeve 102.

A water-type adhesive agent was coated on the outer peripheral surface of the rubber sheet 100 of the belt sleeve 102 mounted on the metal mold 70, and thereafter nylon short fibers (088 dtex×0.4 mm) were electrostatically implanted to form the flocked layer 62 on the whole outer peripheral surface of the rubber sheet 104.

Thereafter, as shown in FIGS. 8 and 9, the metal mold 70, with the belt sleeve 102 thereon, was set in the vulcanizing mold 118 and the bladder 76 expanded while heat was generated by the heating/cooling jacket 126, as shown in FIGS. 10 and 11. The belt sleeve 102 was thereby pressed against the inner peripheral surface 142 of the vulcanizing mold 118 to be pressurized, thereby effecting vulcanization. The vulcanization conditions were set at 150° C. and 1 MPa for twenty minutes. The shaping convex portions 140 of the vulcanizing mold 118 bit into the belt sleeve 102 from the outer periphery of the belt sleeve 102, whereby the grooves 44,46 were formed on the outer periphery of the belt sleeve 102.

Figure 14:
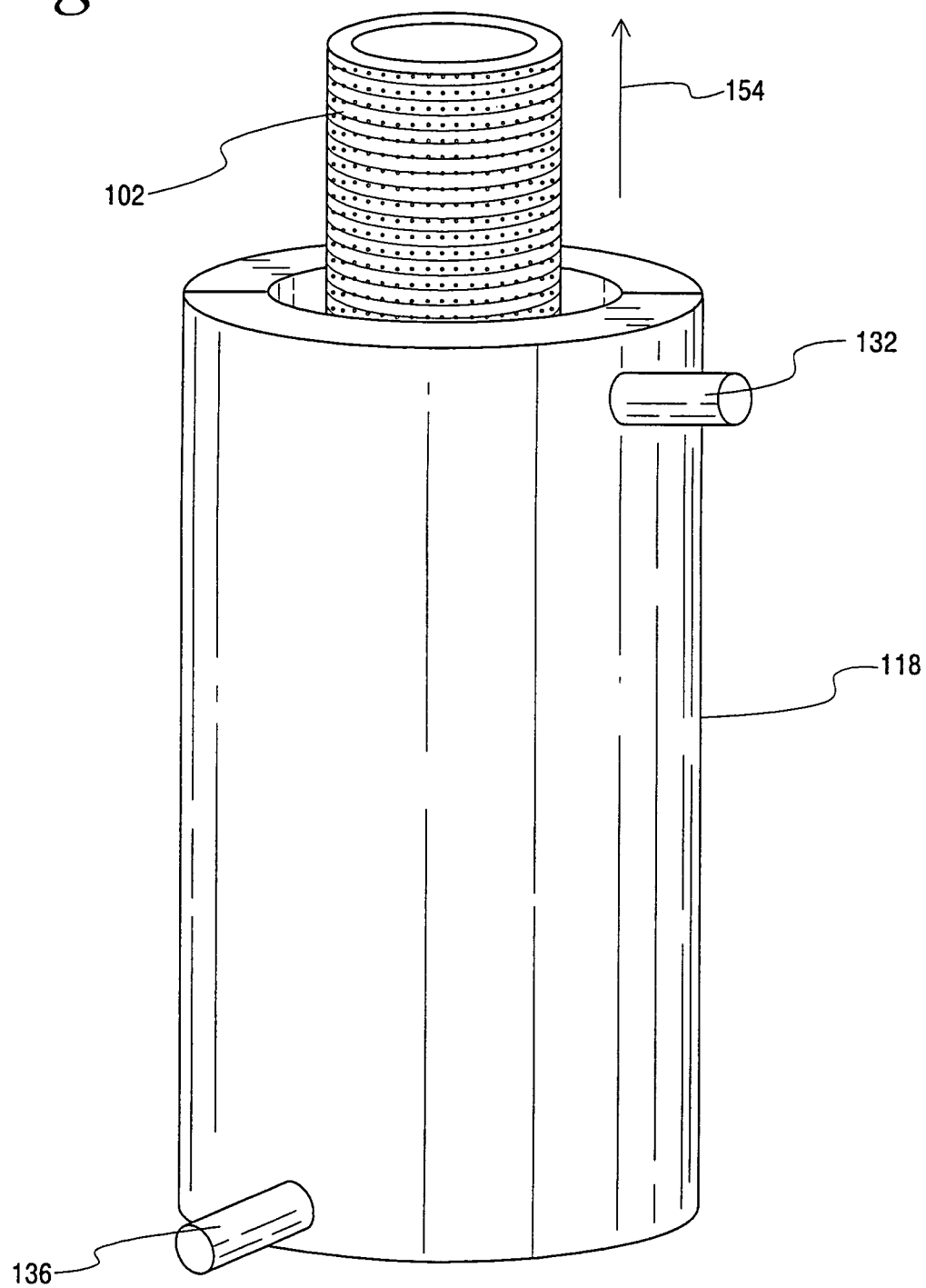
FIG. 14 is a perspective view of the vulcanizing mold wherein the vulcanized belt sleeve is in the process of being separated.

Thereafter, the metal mold 70 was pulled out from the vulcanizing mold 118, as shown in FIGS. 12 and 13, with the vulcanized belt sleeve 102 remaining in the vulcanizing mold 118, which was thereafter cooled through the heating/cooling jacket 126. The vulcanized belt sleeve 102 was then taken out from the vulcanizing mold 118, as shown in FIG. 14.

The vulcanized belt sleeve 102 was cut into widths W by a cutter, thereby producing V-ribbed belts 10 having the construction shown in FIG. 1.

Comparative Example 4

The V-ribbed belt was obtained in the same basic manner as described above, with the rubber sheet forming the extensible rubber layer, manufactured in the same manner as described above, and the rubber sheet for forming the rib rubber layer, manufactured at a thickness of 2.5 mm. The rubber sheet forming the cushion rubber layer was not used.

With respect to V-ribbed belts for Inventive Embodiments 1 to 8 and Comparative Examples 1 to 5, the resistance to sound emission, the frictional properties, and the heat resistance and decay resistance were estimated, and the results shown in Table 3.

The resistance to sound emission was estimated by a misalignment sound emission test. A testing machine used for this estimation was constructed by training the belts around a driving pulley (diameter of 120 mm), a driven pulley (diameter of 120 mm) and a tension pulley (diameter of 70 mm). Misalignment was set at an angle of 1.86° between the driving pulley and the driven pulley. The V-ribbed belts were suspended between the respective pulleys, and made to run at room temperature conditions while the rotational speed for the driving pulley was set to 1000 rpm. A load was imposed on the driving pulley so that the belt tension was equal to 6 kgf/rib. A load of 2.1 Nm/rib was applied to the driven pulley. The sound emission level, when the V-ribbed belt was run as described above, was estimated on the basis of the following five stages. "5" represents a state wherein the sound emission level was lowest, whereas "3" and higher stages represent levels wherein the sound emission was not considered to be significant.

The test of the resistance to sound emission, described above, was carried out under dry conditions in one state (DRY) and separately under conditions wherein water was poured on the components at 60 cc/min representing a separate state (WET). The more specific quantifications of sound level were as follows:
5: no sound was heard;
4: emitted sound was heard through a stethoscope;
3: emitted sound was slightly heard;
2: emitted sound was heard; and
1: emitted sound was clearly heard.

With respect to the test of the frictional properties, the V-ribbed belt was cut to a predetermined length and hung on a guide roller (diameter 60 mm) so that the winding angle was equal to 90°. One end of the V-ribbed belt length was fixed with a weight of 1.75 kgf/rib suspended from the other end of the V-ribbed belt length. A guide roller was rotated at 43 rpm. The tension $T_1$ at the tightened side of the one end and the tension $T_2$ at the loosened side of the other end were measured by reading the value on a load cell. The friction coefficient ($\mu=(1/2\pi)$ 1 n $(T_1/T_2)$) was determined from the tension ratio $(T_1/T_2)$. The test of the frictional properties was carried out under conditions in a dry state (DRY) and wet state (WET), wherein water was poured on the components at 60 cc/min.

A running test machine was used to test heat resistance and the decay durability. The machine had a driving pulley (diameter of 120 mm), an idler pulley (diameter of 85 mm), a driven pulley (diameter of 120 mm) and a tension pulley (diameter of 45 mm). The V-ribbed belts were placed around the respective pulleys so that the winding angle around the tension pulley was set to 90° and the winding angle around the idler pulley was set to 120°. The V-ribbed belt was run under conditions wherein the environmental air temperature was at 120° C. and the driving pulley was operated at 4900 rpm. A load was imposed on the driving pulley so that the belt tension was equal to 40 kgf/rib under the above conditions. A load 12 PS was placed on the driven pulley. As described above, the V-ribbed belts were run for a maximum of 400 hours. The times at which six cracks extending to the load carrying cord were generated was measured.

From the results shown in Table 3, it can be seen that the heat resistance and the decay durability in the respective embodiments were not lost. The friction coefficients were low under both DRY condition and WET conditions. Furthermore, the resistance to sound emission was excellent.

On the other hand, although no problem occurred with respect to the heat resistance and the decay durability in Comparative Examples 1 to 3, the friction coefficient increased, and the occurrence of abnormal sound was confirmed. In the Comparative Examples having a structure in which the cushion rubber layer was not provided, and only the rib rubber layer was provided, the friction coefficient was low, and the resistance to sound emission was enhanced. However, the heat resistance and the decay durability were greatly deteriorated.

The foregoing disclosure of specific embodiments is intended to be illustrative of the broad concepts comprehended by the invention.

The invention claimed is:
1. A power transmission belt comprising:
a body having a length, a width between laterally spaced side surfaces, an inside and an outside,
the body comprising a first rubber composition in which at least one load carrying member is embedded and extends in a lengthwise direction,
the body comprising a plurality of laterally spaced ribs extending lengthwise of the body and having exposed surfaces on one of the inside and outside of the body to engage a complementarily-shaped pulley to drive or be driven by the pulley, the ribs comprising a second rubber composition in which: a) a plasticizer of 8.3 to 10.7 $(cal/cm^3)^{1/2}$ in solubility parameter; and b) solid lubricant are respectively blended in an amount: i) 5 to 25 pts.wt.; and ii) 5 to 50 pts.wt. per 100 pts.wt. ethylene-α-olefin elastomer, the body further comprising short fibers in the second rubber composition implanted at the exposed, pulley-engaging rib surfaces directly against the second rubber composition without being mixed with and fully embedded in the second rubber composition, the ribs having a composition causing bleeding of the plasticizer to the exposed pulley-engaging rib surfaces and into the implanted short fibers to thereby reduce a coefficient of friction between the exposed pulley-engaging rib surfaces and cooperating pulley surfaces as the power transmission belt is operated.

2. The power transmission belt according to claim 1 wherein the body comprises a first layer comprising the first rubber composition and a second layer joined to the first layer and comprising the second rubber composition and the first rubber composition comprises ethylene-α-olefin elastomer without the plasticizer in the first rubber composition.

3. The power transmission belt according to claim 2 wherein the first layer has an inside surface to which the second layer is joined.

4. The power transmission belt according to claim 3 wherein the second layer has inside and outside surfaces with the inside surface of the first layer against the outside surface of the second layer and the ribs are defined by applying pressure to the second layer to form grooves between adjacent ribs so that the inside surface of the first layer and the outside surface of the second layer are caused to have a conforming non-planar shape.

5. The power transmission belt according to claim 4 wherein the short fibers are defined as a flocked layer on the exposed, pulley-engaging rib surfaces.

6. The power transmission belt according to claim 5 wherein the plasticizer comprises an ether ester type plasticizer.

7. The power transmission belt according to claim 5 wherein the solid lubricant is at least one of: a) graphite; b) molybdenum disulfide; and c) polytetrafluoroethylene.

8. The power transmission belt according to claim 6 where the solid lubricant is at least one of: a) graphite; b) molybdenum disulfide; and c) polytetrafluoroethylene.

9. The power transmission belt according to claim 2 wherein the ribs are on the inside of the body and the body comprises a third rubber composition outside of the at least one load carrying member in which short fibers are embedded.

10. The power transmission belt according to claim 9 wherein the short fibers embedded in the third rubber composition are randomly oriented.

11. The power transmission belt according to claim 2 wherein the ribs are formed on the inside of the body by molding without grinding/cutting the second rubber composition.

12. The power transmission belt according to claim 2 wherein the short fibers comprise at least one of: a) rayon; b) cotton; c) polyester; d) polyamide; e) aramid; f) vinylon; g) carbon; and h) polytetrafluoroethylene.

13. The power transmission belt according to claim 2 wherein the short fibers have: a) a length in a range of 0.05 to 2.5 mm; b) a diameter in a range of 3 to 80 μm; and c) an aspect ratio (length/diameter) in a range of 30 to 300.

14. The power transmission belt according to claim 13 wherein the short fibers have an implantation density in a range of 10,000 to 50,000 fibers/cm$^2$.

15. The power transmission belt according to claim 2 wherein the short fibers are implanted using an electrostatic implanting process.

16. The power transmission belt according to claim 1 wherein the ribs are formed from a layer with the second rubber composition that is molded into a final shape without removing the rubber composition from the layer.

17. The power transmission belt according to claim 9 wherein the at least one load carrying member is embedded in the third rubber composition.

18. The power transmission belt according to claim 3 wherein the inside surface is at a boundary layer between the first and second layers that has a non-planar shape.

19. The power transmission belt according to claim 18 wherein the boundary layer has a wave pattern.

20. The power transmission belt according to claim 2 wherein the second layer is made from a sheet having a thickness of from 0.3 to 2.0 mm.

21. The power transmission belt according to claim 11 wherein the ribs are formed on the inside of the body into a final shape through pressure application against a complementarily-shaped mold surface.

22. The power transmission belt according to claim 10 wherein the at least one load carrying member is embedded in the third rubber composition.

23. The power transmission belt according to claim 1 wherein the body comprises a first layer comprising the first rubber composition and a second layer joined to the first layer and comprising the second rubber composition, the short fibers defined as a flocked layer on the second layer at the exposed, pulley-engaging rib surfaces.

24. The power transmission belt according to claim 23 wherein the short fibers in the flocked layer make up a majority of fibers in the second layer.

25. The power transmission belt according to claim 23 wherein the short fibers in the flocked layer are the only short fibers in the second layer.

* * * * *